(12) United States Patent
Gorman et al.

(10) Patent No.: US 6,798,411 B1
(45) Date of Patent: Sep. 28, 2004

(54) IMAGE PROCESSING

(75) Inventors: Christopher L. Gorman, Portland, OR (US); Doug Brucks, McKinney, TX (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/429,881

(22) Filed: Oct. 29, 1999

(51) Int. Cl.[7] .............................................. G06T 17/00
(52) U.S. Cl. .................. 345/428; 345/423; 345/420; 345/441; 345/581; 345/619; 382/154
(58) Field of Search ................................ 345/419, 619, 345/646, 441, 427, 423, 581, 420, 440, 591, 428; 382/154, 276, 285

(56) References Cited

U.S. PATENT DOCUMENTS

| | | | |
|---|---|---|---|
| 4,600,919 A | | 7/1986 | Stern |
| 5,124,914 A | | 6/1992 | Grangeat |
| 5,163,126 A | | 11/1992 | Einkauf et al. |
| 5,731,819 A | | 3/1998 | Gagne et al. |
| 5,929,860 A | * | 7/1999 | Hoppe |
| 6,057,859 A | | 5/2000 | Handelman et al. |
| 6,191,796 B1 | * | 2/2001 | Tarr |
| 6,198,486 B1 | * | 3/2001 | Junkins et al. |
| 6,208,347 B1 | | 3/2001 | Migdal et al. |
| 6,219,070 B1 | * | 4/2001 | Baker et al. |
| 6,262,737 B1 | * | 7/2001 | Li et al. |
| 6,262,739 B1 | * | 7/2001 | Migdal et al. ............... 345/423 |
| 6,337,880 B1 | | 1/2002 | Cornog et al. |
| 6,388,670 B2 | | 5/2002 | Naka et al. |

OTHER PUBLICATIONS

Lewis "Pose Space Deformation: A Unified Approach to Shape Interpolation and Skeleton–Driven Deformation" Centropolis, New Orleans, LA, 165–172.

Lasseter "Principles of Traditional Animation Applied to 3D Computer Animation" Pixar, San Rafael, California, 1987.

Thomas (Contributor) et al., "The Illusion of Life: Disney Animation" 47–51.

Hoppe, "Progressive Meshes" Microsoft Research, 99–108, http://www.research.microsft.com/research/graphics/hoppe/.

Popovic et al., "Progressive Simplicial Complexes" Microsoft Research, http://www.research.microsft.com/~hoppe/.

Hoppe "Efficient Implementation of progressive meshes" Coput. & Graphics vol. 22, No. 1, pp. 27–36, 1998.

Taubin et al., "Progressive Forest Spilt Compression" IBM T.J. Watson Research Center, Yorktown Heights, NY.

Cohen–Or et al., "Progressive Compression of Arbitrary Triangular Meshes" Computer Science Department, School of Mathematical Sciences, Tel Aviv, Israel.

Bajaj et al., "Progressive Compression and Transmission of Arbitrary Triangular Meshes" Department of Computer Sciences, University of Texas at Austin, Austin, TX.

Pajarola et al., "Compressed Progressive Meshes" Graphics, Visualization & Usability Center, College of Computing, Georgia Institute of Technology, Jan. 1999.

Alliez et al., "Progressive Compression for Lossless Transmission of Triangle Meshes" University of Southern California, Los Angeles, CA, 195–202.

(List continued on next page.)

Primary Examiner—Mark Zimmerman
Assistant Examiner—Kimbinh T. Nguyen
(74) Attorney, Agent, or Firm—Fish & Richardson P.C.

(57) ABSTRACT

A method of constructing a two-dimensional image includes receiving information describing a two-dimensional N-gon mesh of vertices and constructing an image by coloring at least some of the N-gons based on the respective vertices of the N-gons.

20 Claims, 21 Drawing Sheets

OTHER PUBLICATIONS

Chow "Optimized Geometry Compression for Real-time Rendering" Massachusetts Institute of Technology, Proceedings Visualization 1997, Oct. 19–24, 1997, Phoenix, AZ, 347–354.

Markosian "Real-Time Nonphotorealistic Rendering" Brown University site of the NSF Science and Technology Center for Computer Graphics and Scientific Visualization, Providence, RI.

Elber Line Art Rendering via a Coverage of Isoperimetric Curves, IEEE Transactions on Visualization and Computer Graphics, vol. 1, Department of Computer Science, Technion, Israel Institute of Technology, Haifa, Israel, Sep. 1995.

Zeleznik et al., "SKETCH: An Interface for Sketching 3D Scenes" Brown University site of the NSF Science and Technology Center for Computer Graphics and Scientific Visualization, 1996.

Landsdown et al., "Expressive Rendering: A Review of Nonphotorealistic Techniques" IEEE Computer graphics and Applicatons, 29–37, 1995.

Raskar "Image Precision Silhouette Edges" University of North Carolina at Chapel Hill, Microsoft Research, 1999 Symposium on Interactive 3D Graphics Atlanta GA, 135–231, 1999.

Ma et al., "Extracting Feature Lines for 3D Unstructured Grids" Institute for Computer Applications in Science and Engineering (ICASE), NASA Langley Research Center, Hampton, VA, IEEE, 1997.

Samet "Applications of spatial data structures: computer graphics, image processing, and GIS" University of Maryland, Addison–Wesley Publishing Company, 1060–1064, Reading, MA, Jun. 1990.

Dyn "A Butterfly Subdivision Scheme for Surface Interpolation with Tension Control" ACM Transactions on Graphics, vol. 9, No. 2, Apr. 1990.

Zorin "Interpolation Subdivision for Meshes With Arbitrary Topology" Department of Computer Science, California Institute of Technology, Pasadena, CA.

Lee "Navigating through Triangle Meshes Implemented as linear Quadtrees" Computer Science Department, Center for Automation Research, Institute for Advanced Computer Studies, University of Maryland College Park, MD, Apr. 1998.

Garland and Heckbert, Surface Simplification Using Quadric Error Metrics, Carnegie Mellon University.

* cited by examiner

IMAGE PROCESSING

BACKGROUND

This invention relates to processing an image.

Pictures displayed on computer screens are made up of a very large number of closely packed dots known as pixels. Although a color or black-and-white image may include many different colors or shades of gray, each individual pixel displays only a single color or a single shade of gray. A computer accesses data to determine how to light up each pixel in an image. For example, the data may be a single number corresponding to a shade of gray, or a collection of numbers that instruct the computer to light a given pixel by mixing different amounts of red, green, and blue.

An image the size of a small computer monitor requires data for nearly half-a-million pixels. The large amount of data needed to describe each pixel in an image can consume a lot of space on a computer hard disk or take a long time to download over a network. Thus, it would be advantageous to develop a technique for reducing the amount of data needed to represent an image.

SUMMARY

A method of constructing a two-dimensional image including receiving information describing a two-dimensional N-gon mesh of vertices and constructing an image by coloring at least some of the N-gons based on the respective vertices of the N-gons.

DETAILED DESCRIPTION

Introduction

Figure 1:
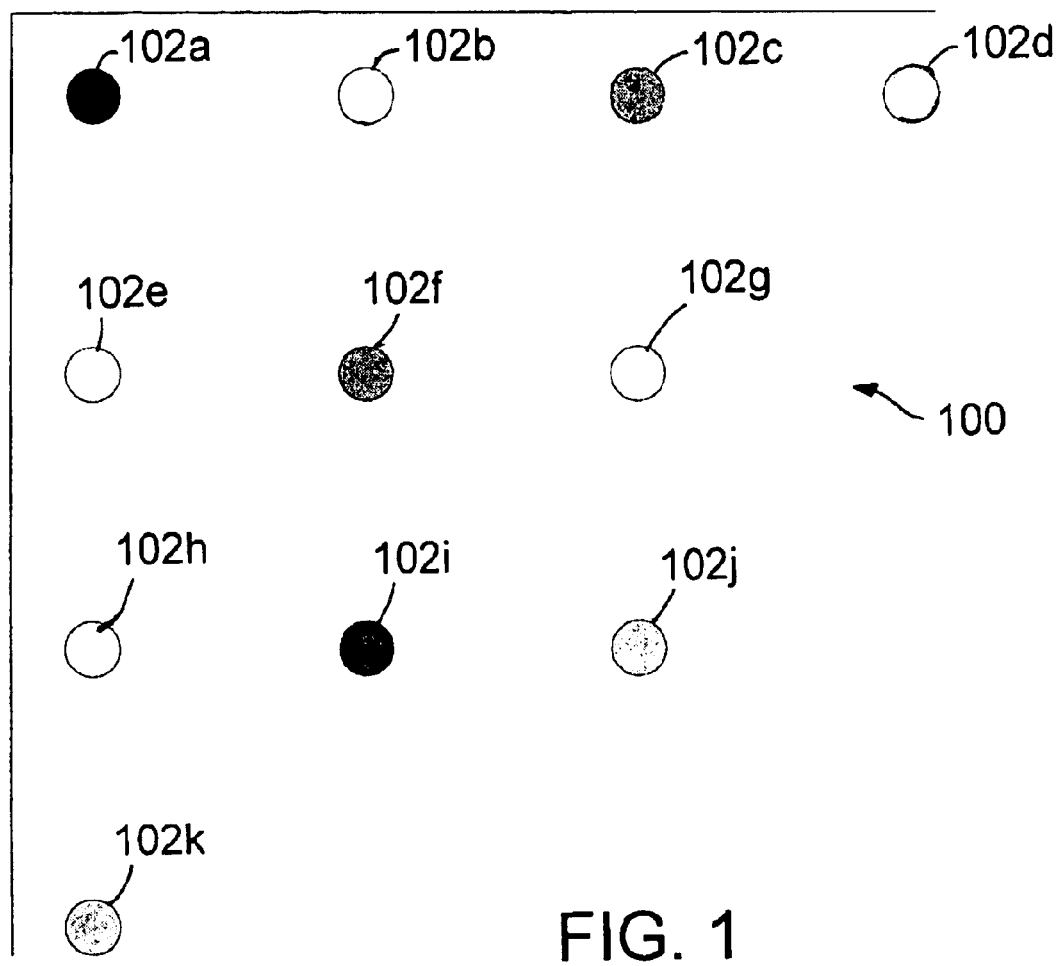
FIG. 1 is a diagram of image pixels.
Figure 2:
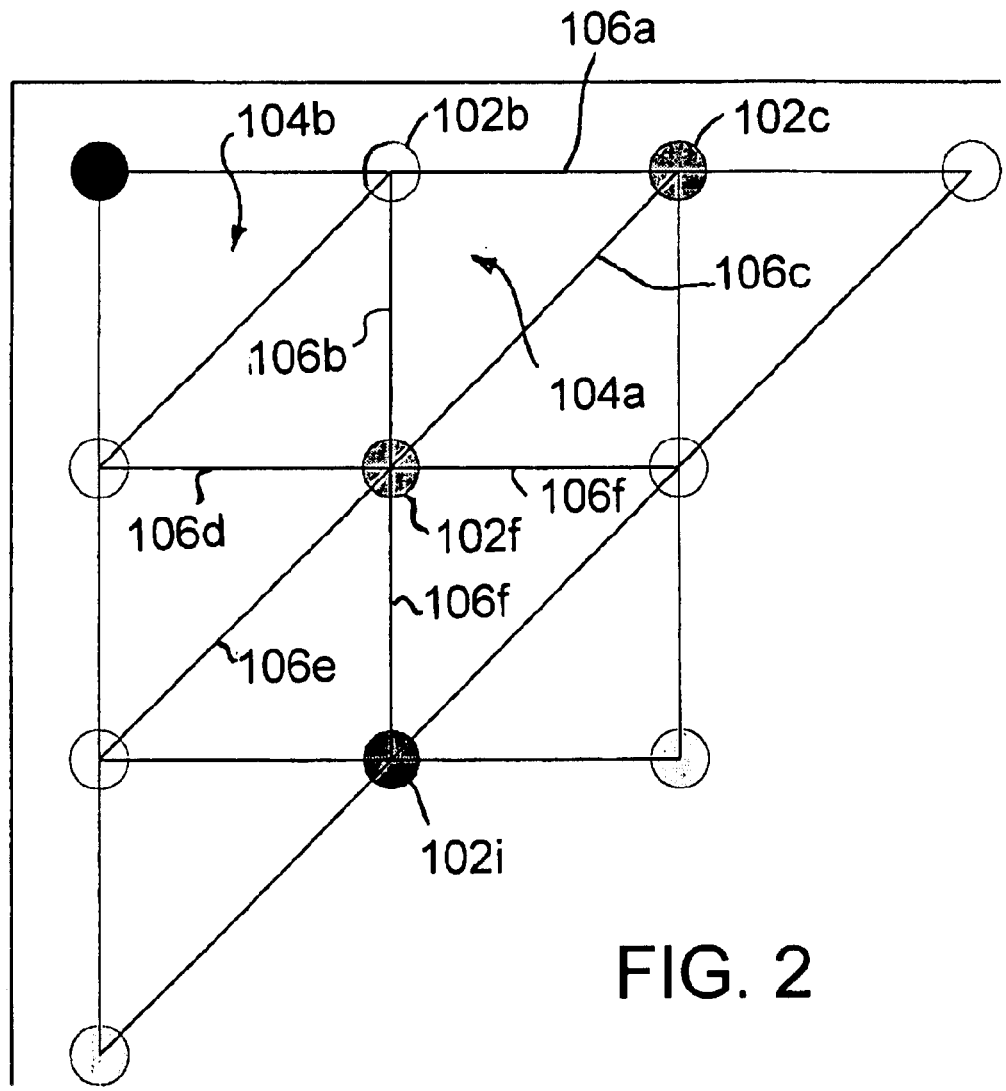
FIG. 2 is a diagram of a mesh made from the image pixels.

FIG. 1 shows a magnification of pixels 102a–102k in one corner of a two-dimensional image 100. As shown in FIG. 2, each set of three pixels can form the corners (vertices) of a triangle. For example, pixels 102b, 102c, and 102f are the vertices of triangle 104a having sides (edges) 106a, 106b, and 106c. Neighboring triangles share vertices. For example, vertex 102b is a vertex of triangle 104b in addition to triangle 104a. This collection of vertices and their interconnections is known as a triangular mesh.

Typically, the triangle lines shown in FIG. 2 are not displayed on a computer screen. FIG. 2, however, does illustrate a way of handling pixels in a two-dimensional image that can both reduce the amount of data needed to represent an image and can speed and enhance special effects such as zooming in on the image.

Figure 3:
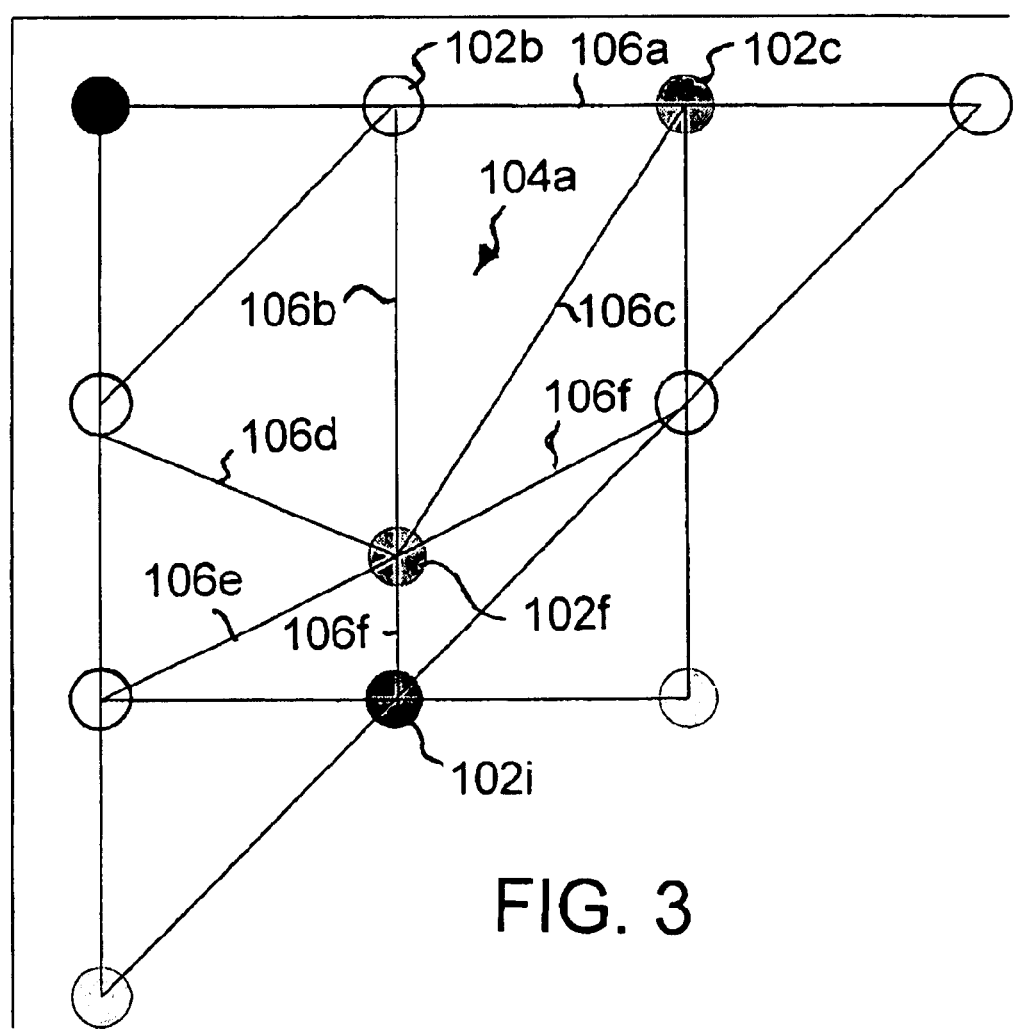
FIG. 3 is a diagram illustrating the concept of edge-collapsing.
Figure 4:
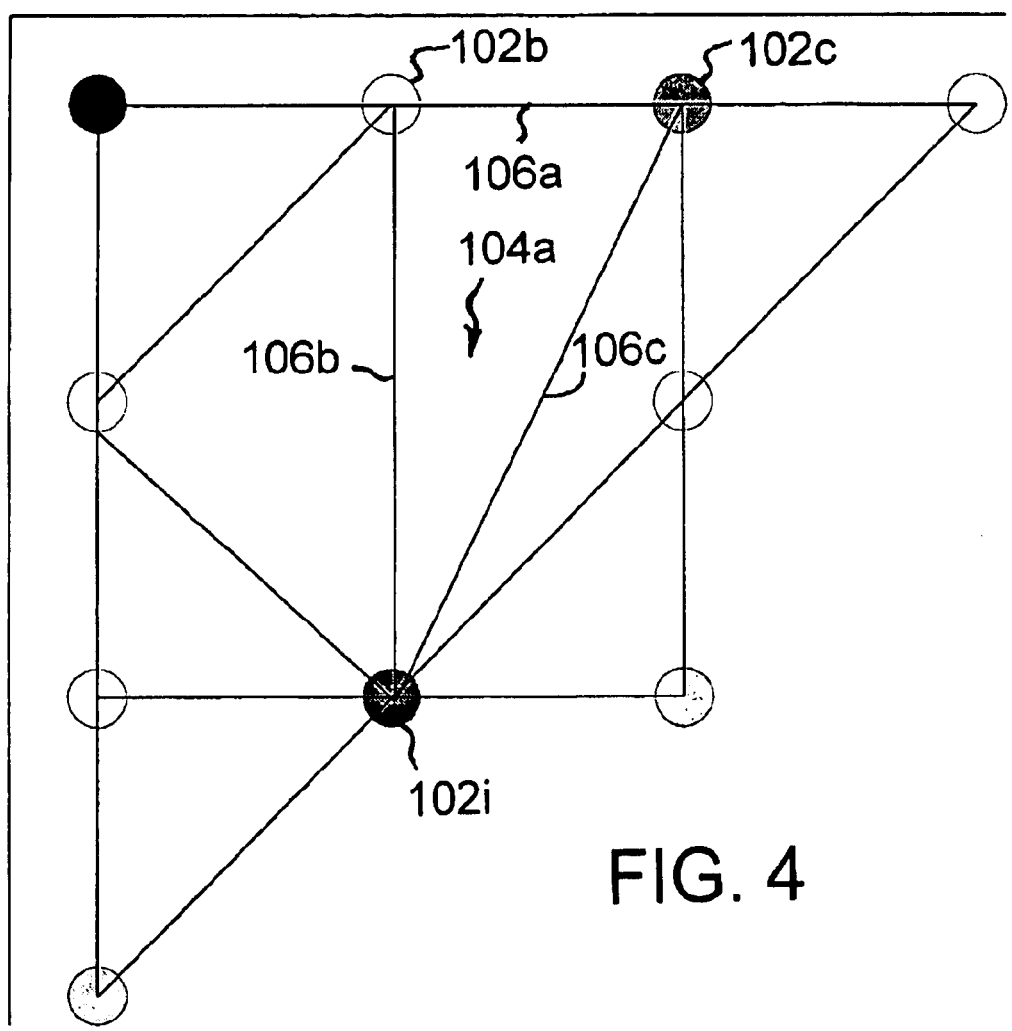
FIG. 4 is a diagram of a mesh after an edge-collapse.

For example, as shown in FIGS. 2–4, portions of the mesh can be selectively eliminated without substantially reducing the quality of the image as perceived by a human eye. For example, instructions may evaluate the triangle edges in FIG. 2 to determine which edge can be removed with the least impact on the appearance of the image. For example, the instructions may determine that removing edge 106f would not substantially alter the image. The instructions can then perform an "edge-collapse".

Conceptually, an edge collapse, as shown in FIG. 3, is like pushing pixel 102f down into pixel 102i and dragging all of pixel 102f's connections to other pixel's along the way. As shown in FIG. 4, the edge-collapsing operation reduced the number of triangles by eliminating pixel 102f, the edge-between pixel 102f and pixel 102i, and edges 106e and 106f. The remaining triangles, such as triangle 104a, are stretched to cover the image. Since fewer triangles cover the image, fewer triangle vertices and their connectivity information are needed to describe the image's triangular mesh. Thus, an image can be described using less data.

Whether or not instructions reduce the mesh, expressing a two-dimensional image as a flat mesh permits the use of a variety of techniques used by 3D graphics applications. For example, pixels bounded by a triangle in the mesh can also be colored using a 3D graphics technique known as Gouraud shading (also called intensity interpolation shading or color interpolation shading).

Figure 5:
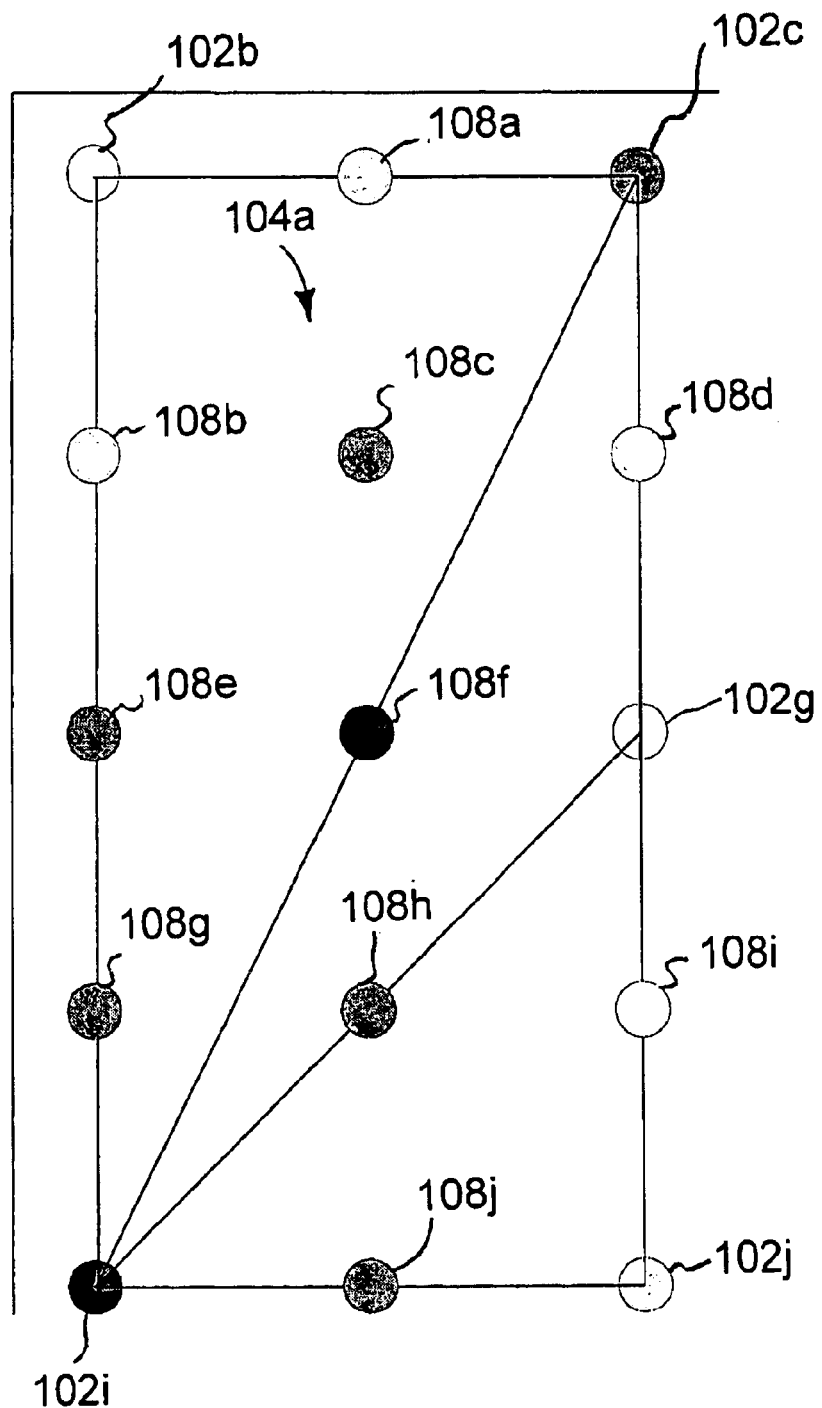
FIG. 5 is a diagram of image pixels determined by a shading algorithm.

Gouraud shading uses the colors of triangle vertices to color-in the triangle area between the vertices. Many standard APIs (Application Program Interfaces), such as DirectX and OpenGL, and popular 3D Graphics Accelerator cards (e.g., 3D cards available from Matrox™ and Diamond™) offer Gouraud shading functions in their APIs. The Gouraud shading functions provided by these cards are used by real-time 3D video games to quickly shade triangles in three-dimensional triangular meshes that form spaceships and other 3D objects. By creating a flat mesh from an image, software (e.g., a browser) displaying an image can take advantage of the fast hardware-implemented coloring routines offered by these 3D graphics cards even though the images are only two-dimensional. This technique can speed image special effects such as zooming in or out of an image. For example, as shown in FIG. 5, a user can zoom in on triangle 104a.

Zooming in or out is achieved by multiplying the vertex coordinates (or a copy of the vertex coordinates) by a scalar value. This has the effect of increasing the distance between vertex coordinates and increasing the size of the triangles. The triangles now require more pixels to fill the interior and edges. Thus, while vertices 102b and 102c were neighbors in FIG. 3, pixel 108a now separates the vertices 102b, 102c after magnification of the image. Vertices 102b, 102c and vertex 102i, however, still form the vertices of triangle 104a, though triangle 104a is now much larger than in FIG. 3. A Gouraud shading function (hardware or software) can quickly compute color values for pixels 108a–108g within triangle 104a.

Many other shading techniques may be used instead of, or in combination with, Gouraud shading. For example, a system may use flat-shading or wire-frame shading. In flat shading, each pixel of a triangle is colored using the average color of the triangle vertices. Wire-frame shading is like Gouraud shading, except the interior pixels are not colored, only the edges. This gives the image an interesting computer-like effect.

Image Processing

Figure 6:
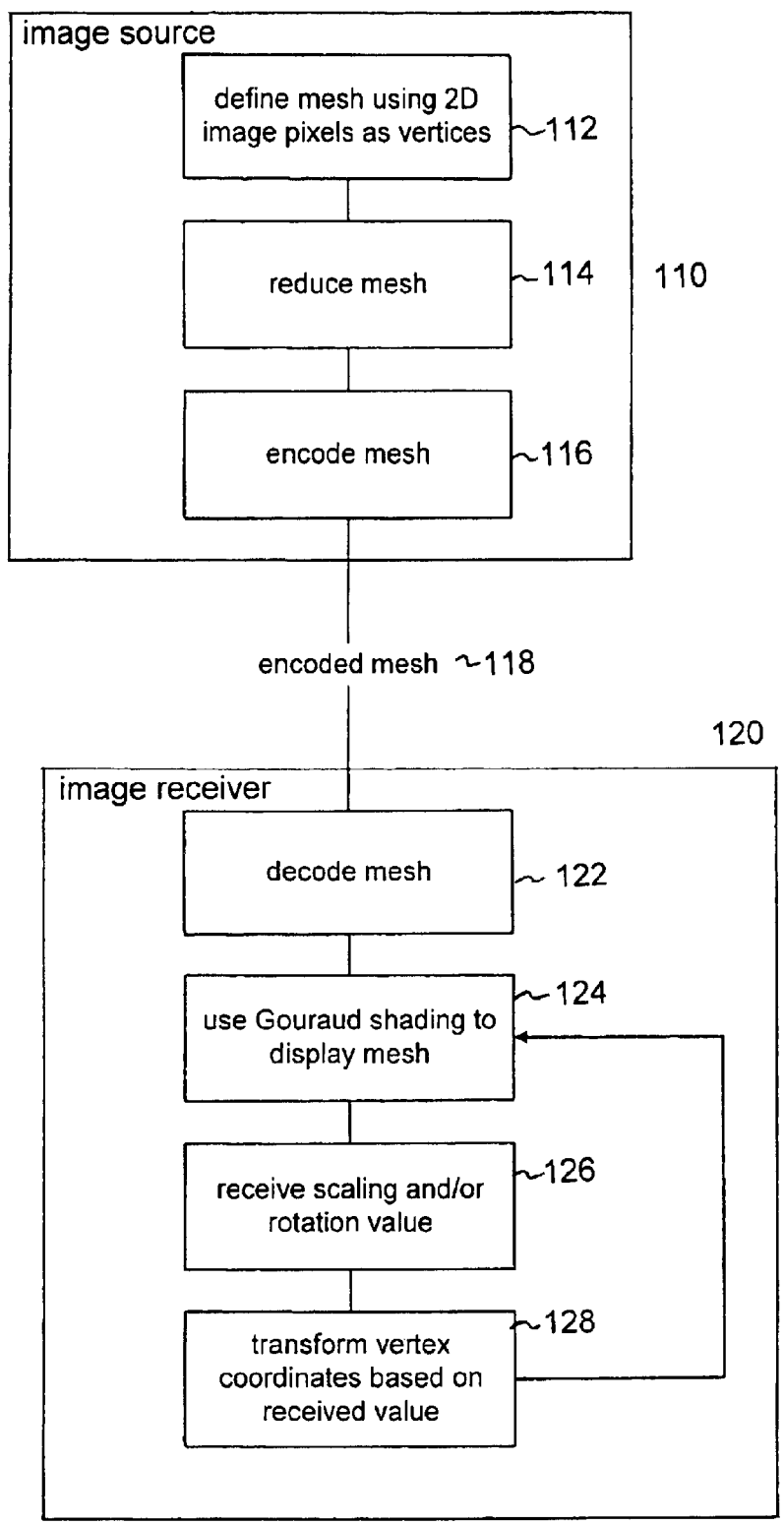
FIG. 6 is a flow diagram of a process for encoding, decoding, and displaying an image.

FIG. 6 shows image encoding software 110 that encodes an image for storage and display by image decoding software 120. The encoding 110 and decoding software 120 may be on different computers such as computers connected via the Internet. The encoded image may be transmitted statically or progressively. A statically transmitted image can be decoded after all encoded information has been received. A progressively transmitted image can be displayed incrementally as the information is received. Of course, the encoding 110 and decoding 120 software may execute on the same computer.

As shown in FIG. 6, the encoding software 110 receives a two-dimensional image, that is, an image having pixels that are in the same plane. The software 110 uses pixels in the image to define 112 a mesh. The mesh may be a triangular mesh, known as a highly-tessellated mesh, or another type of N-gon mesh where N represents the number of sides in the geometric shapes in the mesh. That is, an N-gon mesh can be a quadrilateral mesh (N=4), a polygon mesh (N=5), etc. The mesh may be represented by an array of vertex coordinates and an array of faces where each face has indices into the vertex coordinate array.

Prior to mesh reduction, the software 110 may apply filters to the mesh to identify important edges or to apply special effects that are transmitted as part of the image. The information gained in this pre-processing may guide the edge selection during mesh reduction.

After creating the mesh 112, the software 110 then uses mesh reduction techniques to simplify the mesh. A wide variety of mesh reduction techniques can be used such as edge-collapsing, vertex clustering, and/or vertex decimation. After simplification, the software 110 encodes the mesh for later reconstruction into an image.

The image decoding software 120 decodes the encoded mesh 118 and can use a shading technique 144 to display the image. A user may choose different image special effects 126 such as image scaling (e.g., zooming-in and out), image rotation in any x, y, or z direction, or image shearing. The image may also be perturbed using a modulated sin or cosine function to create a wave-like effect. These special effects transform 126 the coordinates of the mesh vertices, for example, by moving them closer together or farther apart. After determining or receiving the new coordinates of the triangle vertices 128, the software 120 can again use Gouraud shading 124 to "color-in" each triangle.

Edge Collapsing

Figure 7:
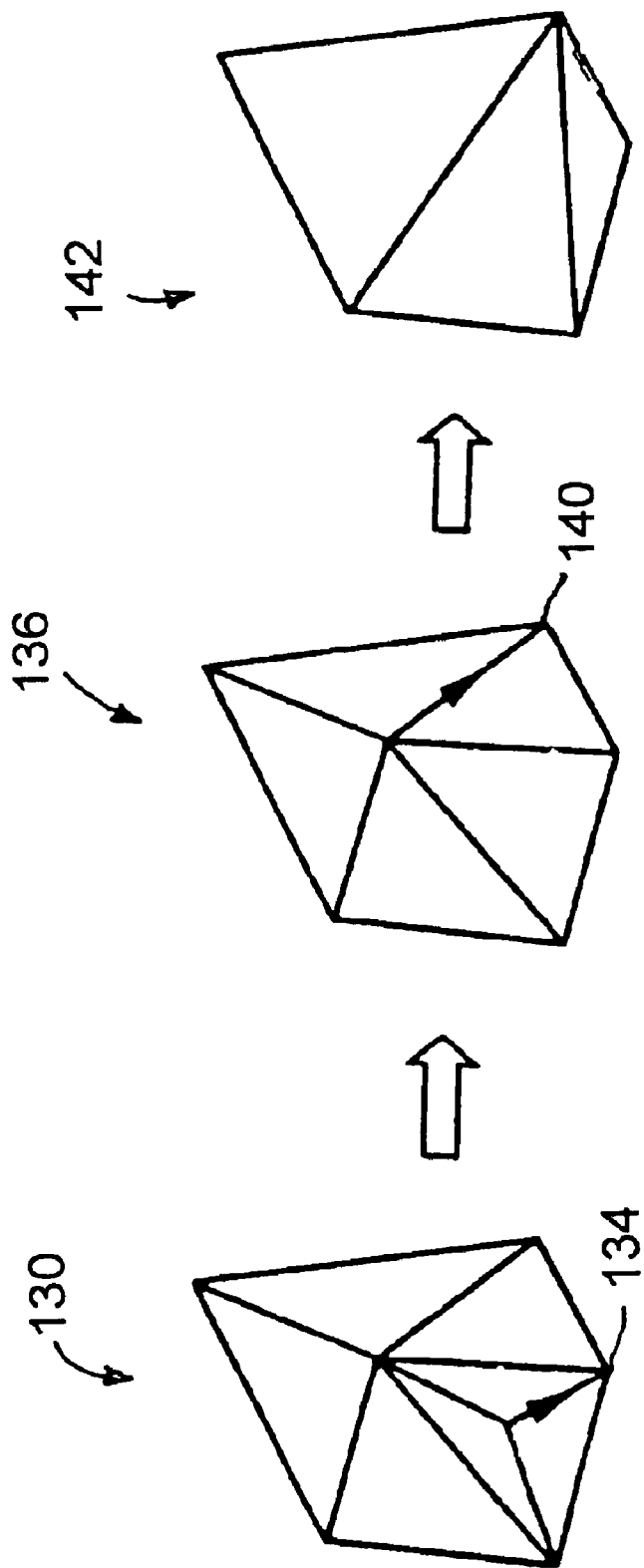
FIG. 7 is a diagram illustrating repeated edge-collapsing.

One type of mesh reduction technique is known as edge-collapsing. FIG. 7 shows repeated edge-collapsing of a mesh 130, 136, 142. As shown, each edge-collapse reduces the number of triangles in the mesh. Thus, after collapsing only two edges 134, 140, a simplified three triangle mesh 142 can cover the same area initially covered by a more intricate seven triangle mesh 130. Empirically, selectively eliminating nearly 80% of mesh edges often does not perceptibly degrade a displayed image. Software may enable a user to control the amount of edge-collapsing.

Figure 8:
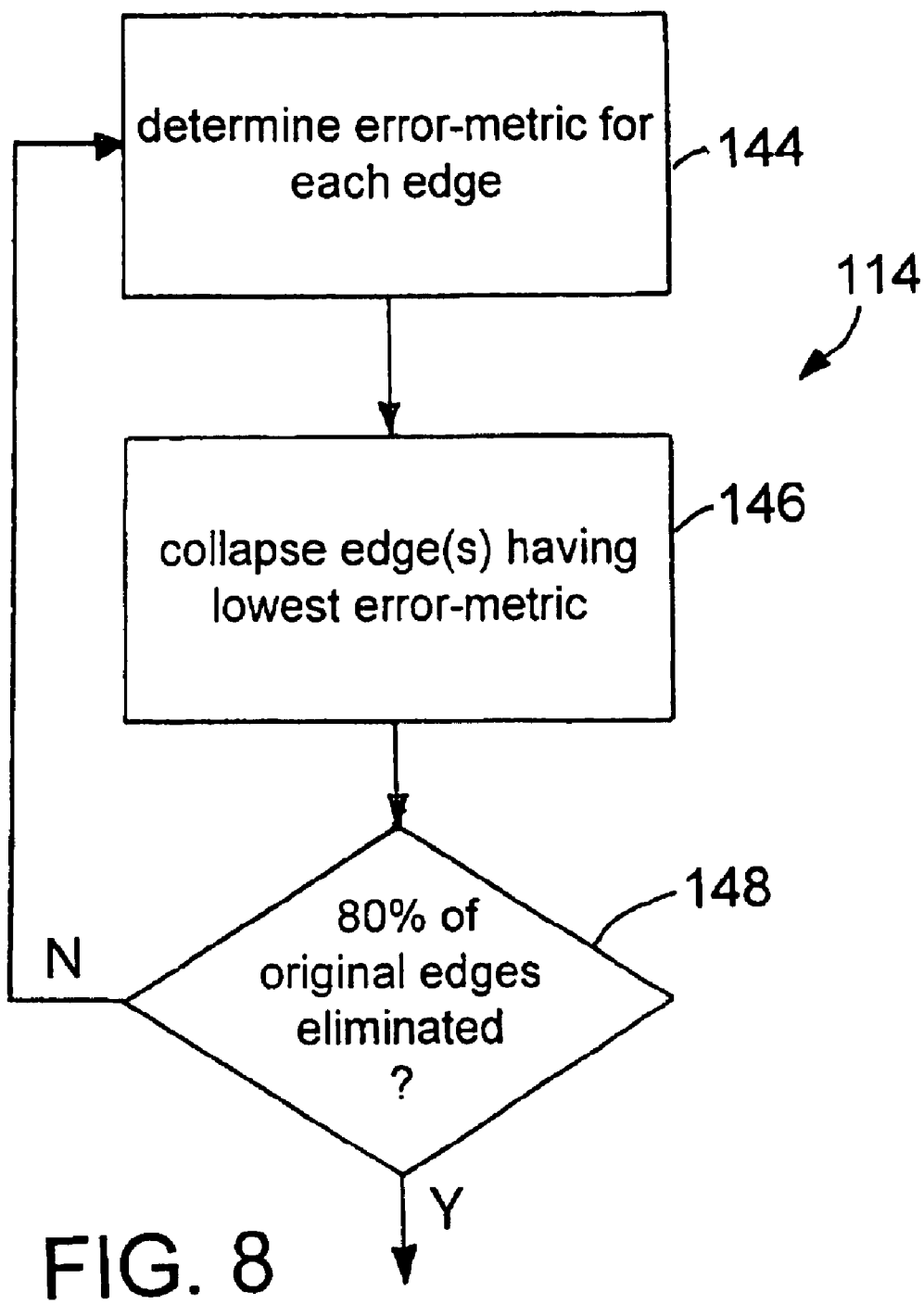
FIG. 8 is a flow chart of a process for repeated edge-collapsing.

FIG. 8 shows a process 114 for using edge-collapsing to simplify a mesh. The process 114 identifies mesh edges that do not contribute significantly to the image. For example, the process 114 can determine 144 an "error-metric" value for each edge and collapse 146 edges having the lowest error metric values. Recalculation of error-metric values and edge-collapsing can repeat 148 until the process 114 eliminates 146 a predefined or dynamically determined number of edges or until the lowest error metric values exceed some empirical or user set threshold. Another method collapses edges with the lowest error metric until a total error-threshold is exceeded. The total error is defined using an image processing heuristic such as the sum of the squared differences between the original image pixels and the current, lower-resolution image pixels.

In one embodiment, the process 114 uses the techniques described in a SIGGRAPH 97 article entitled "Surface Simplification Using Quadric Error Metrics" by Michael Garland and Paul S. Heckbert (Michael Garland and Paul S. Heckbert. Surface Simplification Using Quadric Error Metrics, Proceedings of SIGGRAPH 97, Computer Graphics Proceedings, Annual Conference Series, pp. 209–216 (August 1997, Los Angeles, Calif.); Addison Wesley; Edited by Turner Whitted; ISBN 0-89791-896-7). The article describes a technique designed and used for simplifying surface topologies in three-dimensional meshes (e.g., smoothing small jagged three-dimensional spikes or bumps). The technique identifies a set of planes whose intersection meet at a vertex and defines the error of the vertex with respect to this set of planes as the sum of squared distances to the planes. Instead of using this technique to smooth a three-dimensional surface, however, the encoding software can use the error-metric to identify edges that can be removed and cause the least amount of perceptible image color (or greyscale) degradation.

The three-dimensional error-metric technique operates on vertices having x, y, and z coordinates. Since the co-planar coordinates of the two-dimensional mesh can have only x and y values, in greyscale pictures, the z value for each vertex coordinate can be set to the greyscale value of the vertex.

In a color embodiment, the process 114 transforms the red, green, and blue (RGB) values of each pixel into YUV values in the luminance/chrominance color space. Y, u, and v can be directly computed as functions of R, G, and B. In the YUV color space, the Y value dominates the u and v values. Hence, the Y value of each vertex can be fed to the error-metric function as the z value for each vertex.

In yet another embodiment, the process applies the Quadric Error Metric to the Y, u, and v components of each vertex. The resulting error metrics (3 per edge) are weighted and averaged together to form a single error metric which is feed into an edge-collapsing function.

Mesh Encoding

Figure 9:
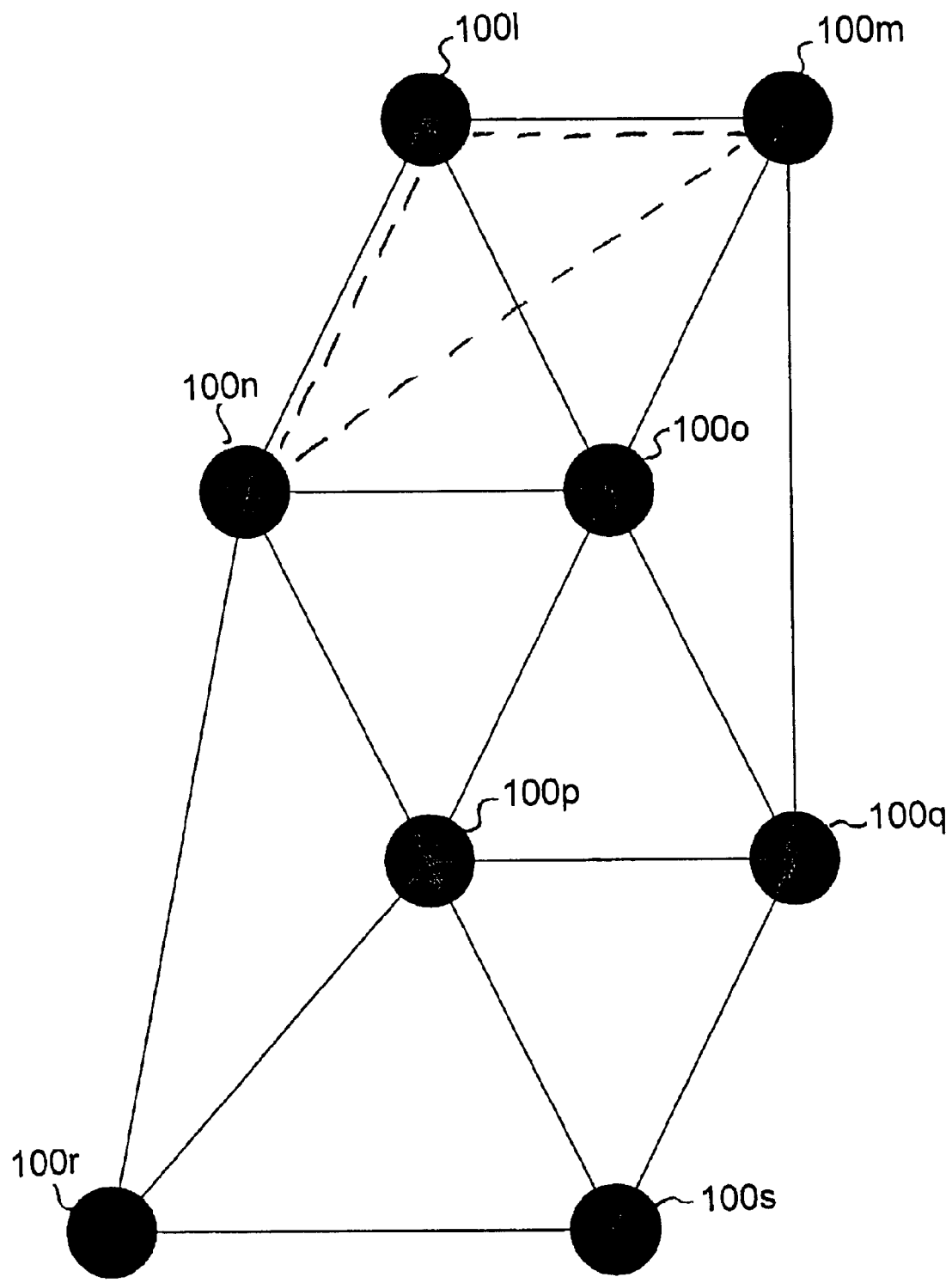
FIG. 9 is a diagram of a mesh.

After mesh reduction (if applied), the resulting mesh can be compactly encoded for storage and subsequent decoding. FIG. 9 shows connected vertices 100*l*–100*s* of a triangular mesh. A large number of other triangular meshes could be formed from the same set of vertices 100*l*–100*s*. For example, instead of a triangle having vertices 100*l*, 100*m*, and 100*o*, a triangle could have vertices of 100*l*, 100*m*, and 100*n* (the dotted triangle). Thus, information must be encoded that describes not only the vertices' coordinates and colors, but also how the triangles fit in the mesh (i.e., their connectivity).

Figure 10:
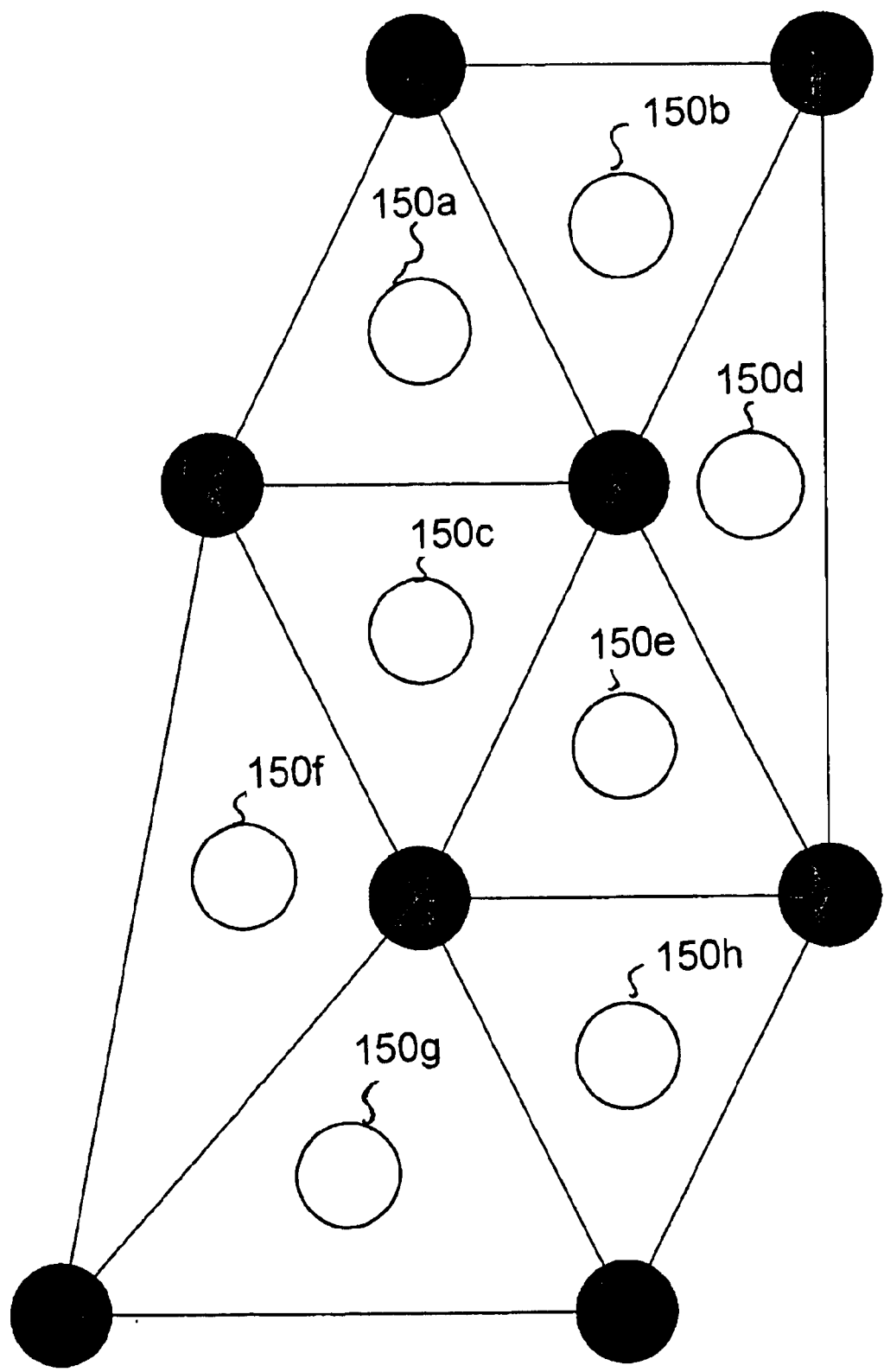
FIG. 10 is a diagram of mesh centroids.
Figure 11:
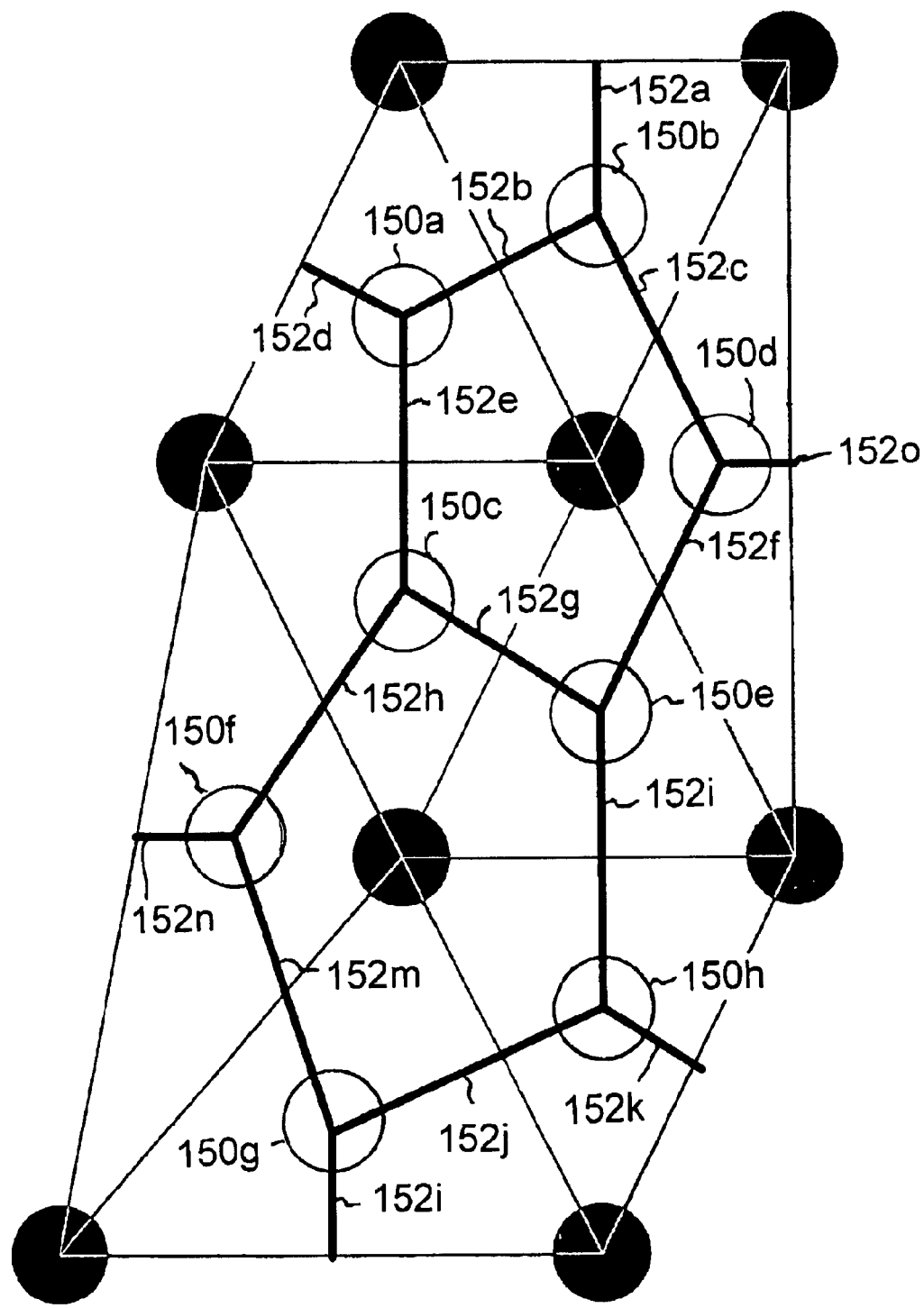
FIG. 11 is a diagram of a dual graph constructed by connecting centroids.
Figure 12:
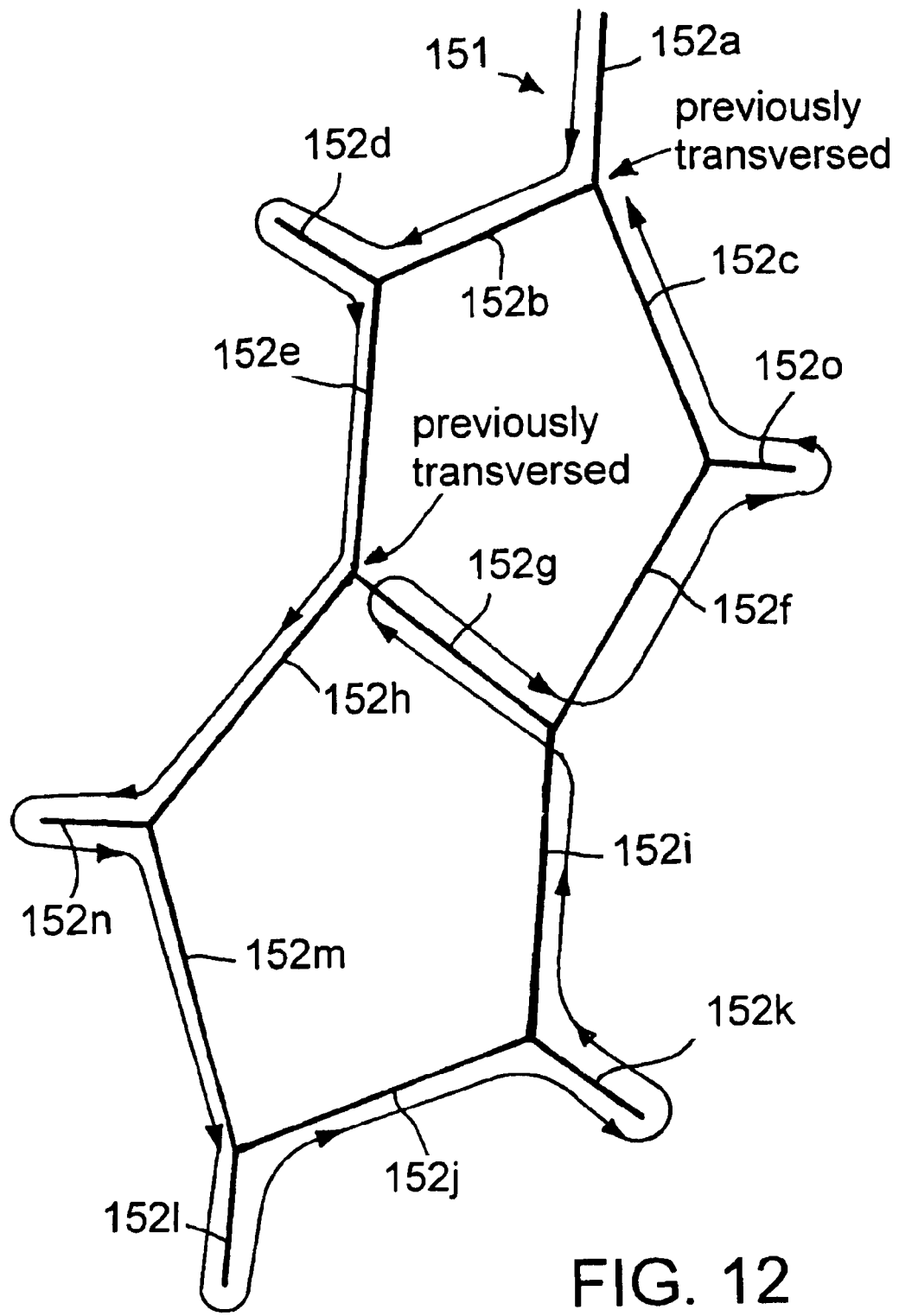
FIG. 12 is a diagram of a dual graph having cycles.
Figure 13:
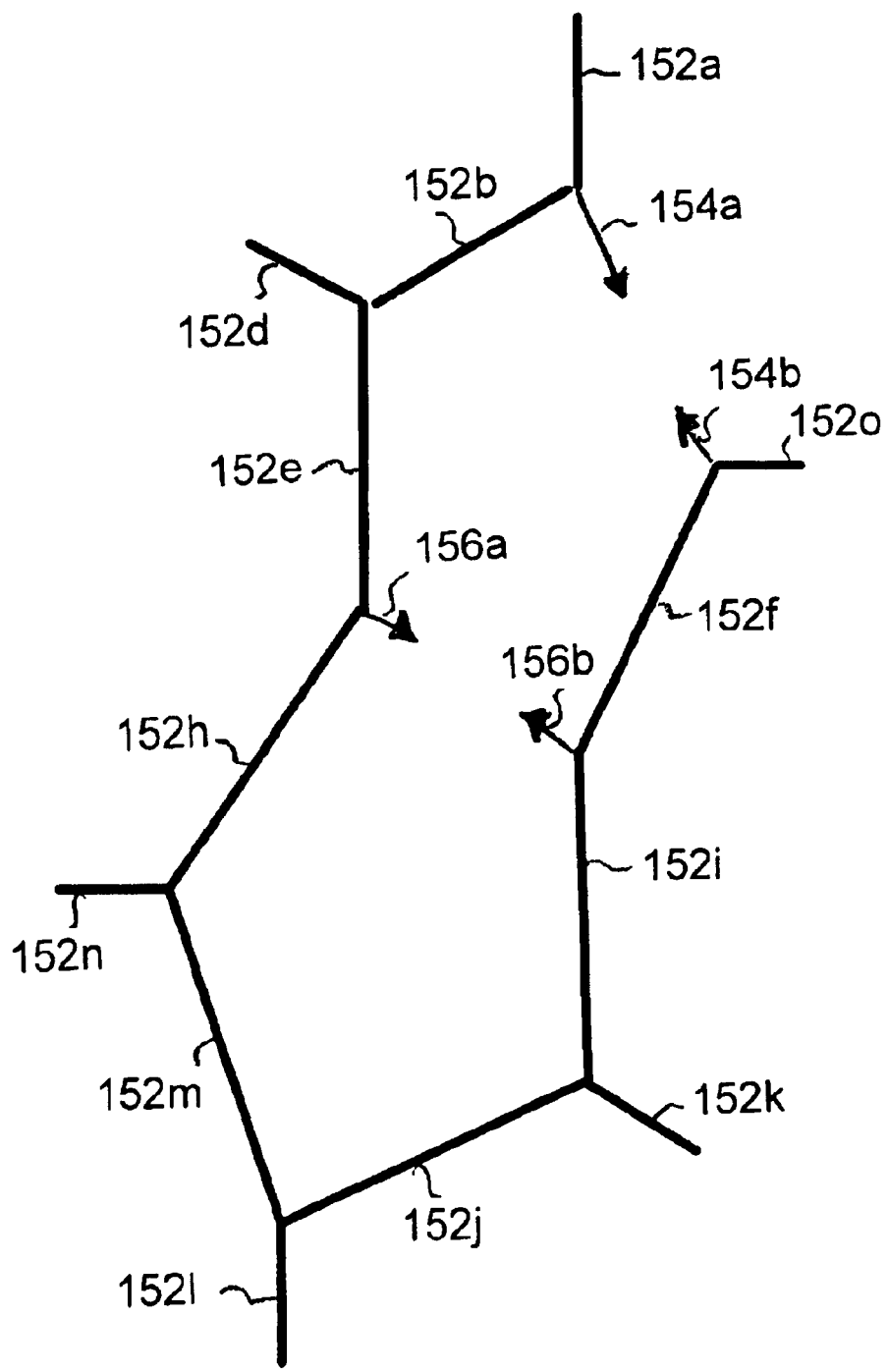
FIG. 13 is a diagram of a dual graph eliminating cycles.

A wide variety of techniques can be used to encode a mesh. FIGS. 10–14 illustrate a technique for representing a mesh as a binary tree. In FIG. 10, software determines the center or centroid 150*a*–150*h* of each triangle in the mesh of FIG. 9. As shown in FIG. 11, by connecting each centroid 150a–150h to centroids in neighboring triangles, and connecting border centroids 150a, 150b, 150d, 150f, 150h to the edge of their respective mesh triangles, software can create a dual graph from the original mesh configuration. As shown in FIG. 12, the dual graph alone can describe a mesh arrangement where each edge is used in no more than two triangles.

As shown in FIG. 12, a dual graph may include loops or cycles such as a cycle formed by graph edges 152g, 152i, 152j, 152m, and 152h and a cycle formed by graph edges 152b, 152c, 152f, 152g, and 152e. By breaking dual graph edges that form cycles, software can "twist" the mesh into a binary tree. To break cycles, software randomly selects an edge (e.g., edge 152a) of the dual graph as the root and traverses the graph by always choosing a left branch if possible. The software records which branch intersections have been visited. When the software returns to an intersection previously encountered, the edge leading to the intersection is selected for breaking. For example, the dual graph of FIG. 13, may be traversed as shown by arrow 151.

Figure 14:
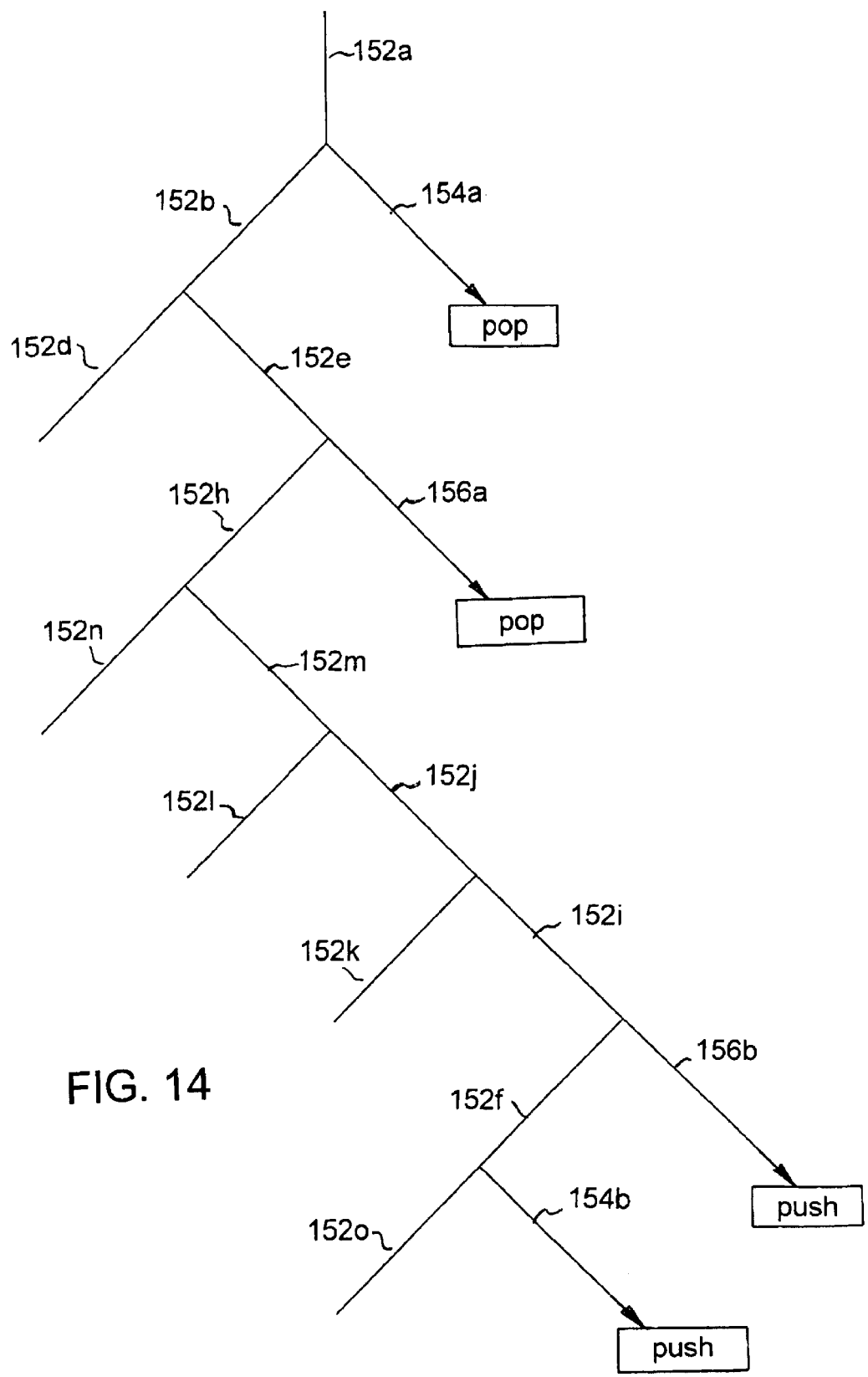
FIG. 14 is a diagram of a binary tree constructed from the dual graph.

As shown in FIG. 14, once software breaks the cycles, traversing the dual graph can produce a binary tree. The broken cycles are represented as "pops" and "pushes". To "untwist" the binary tree into its original shape, the first "pop" 152a is reconnected with the last "push" 154b, the second "pop" 156a is reconnected with the second-to-last "push" 156b, etc. The binary tree can then be encoded using any number of recursive or non-recursive algorithms (e.g., a preorder recursive algorithm). Other trees can be used in lieu of a strictly binary tree. This may be preferred when a mesh is made of N-gons other than triangles.

Figure 15:
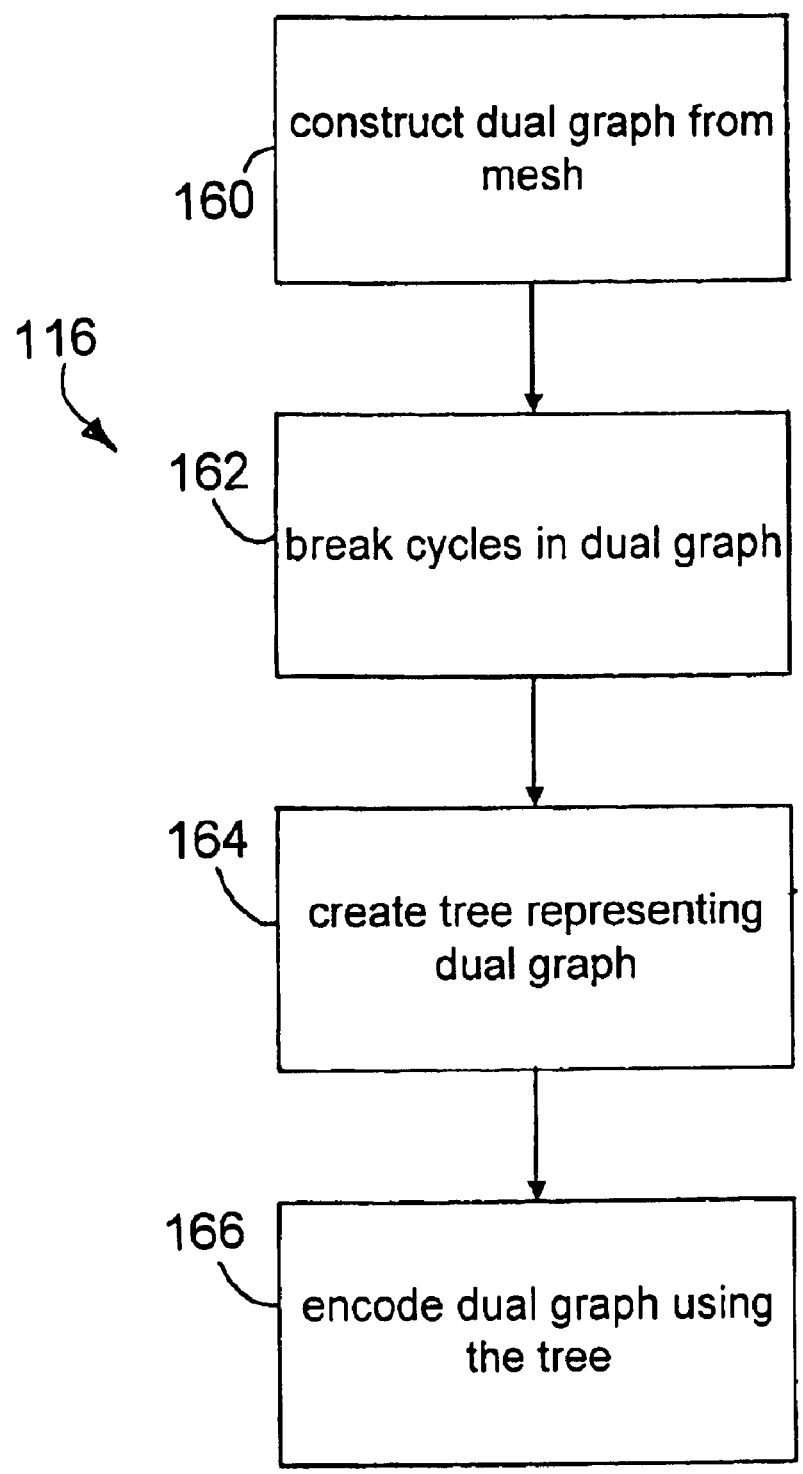
FIG. 15 is a flow chart of a process for encoding a mesh.

To summarize, FIG. 15 shows a process 116 for encoding a mesh. After constructing a dual graph from a mesh 160 and breaking graph cycles 162, traversing the dual graph yields a binary tree 164. Algorithms can encode the binary tree for inclusion with data describing the coordinates of vertices in the mesh, and the colors (or grey-scale value) of each vertex.

The mesh representation of the image could be encoded using other techniques including techniques that support progressive mesh construction and rendering. For example, the mesh could be encoded by compressing the actions needed to reconstruct the mesh progressively. Progressive transmission enables a system to display construction of the mesh as progressive information arrives instead of awaiting complete transmission.

Figure 16:
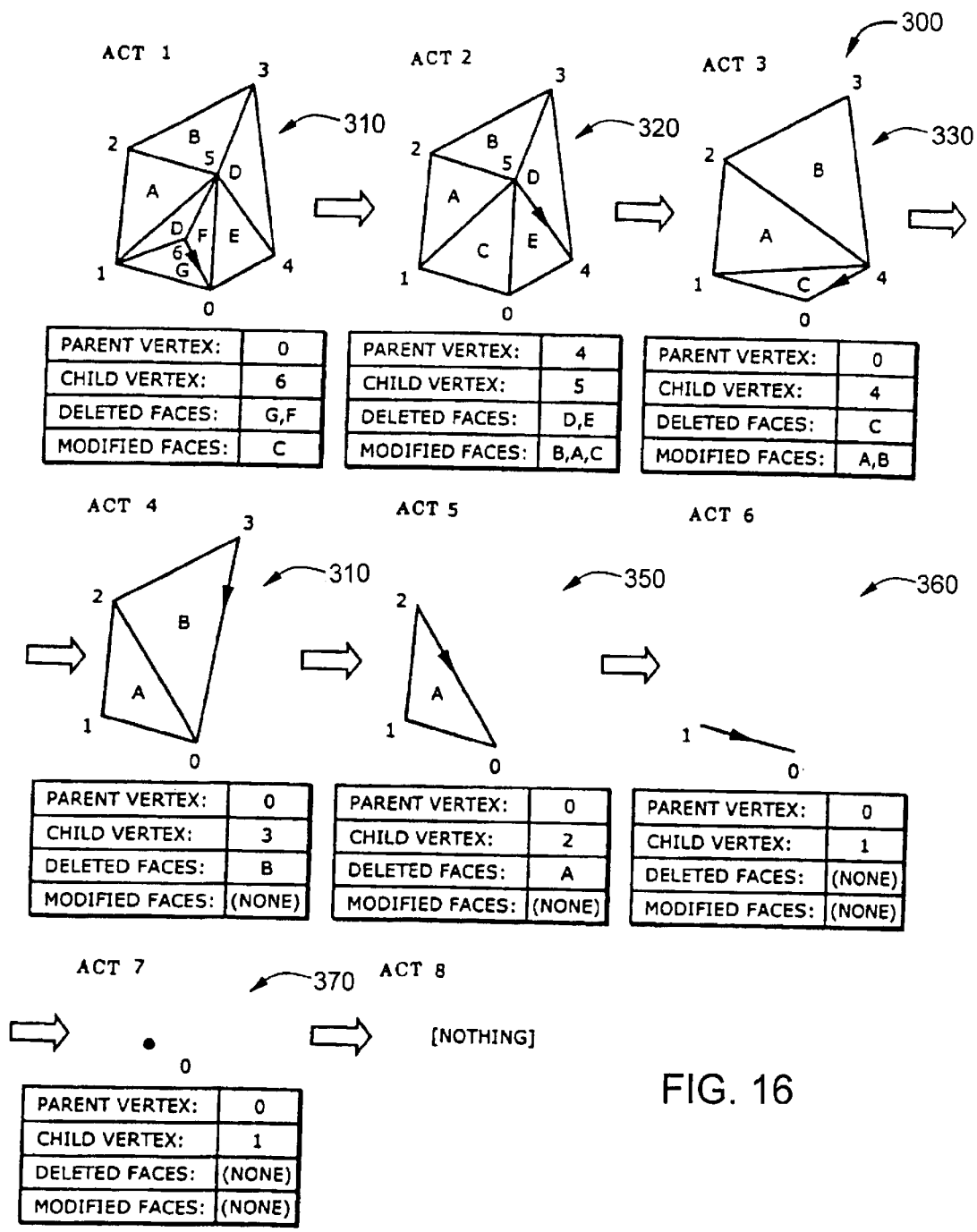
FIGS. 16–20 are diagrams illustrating update records that can be used to progressively transmit mesh connectivity.
Figure 17:
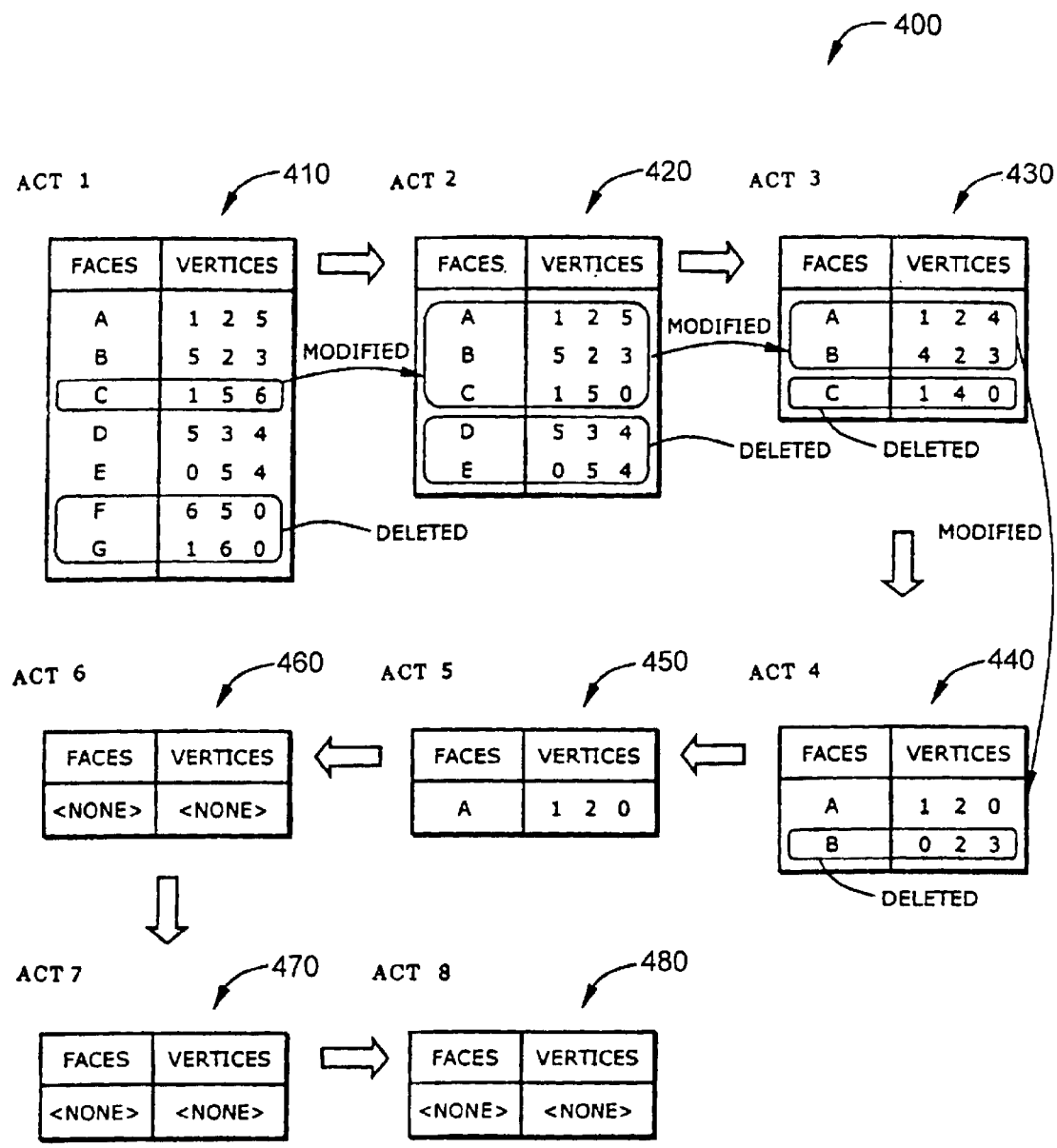
Figure 18:
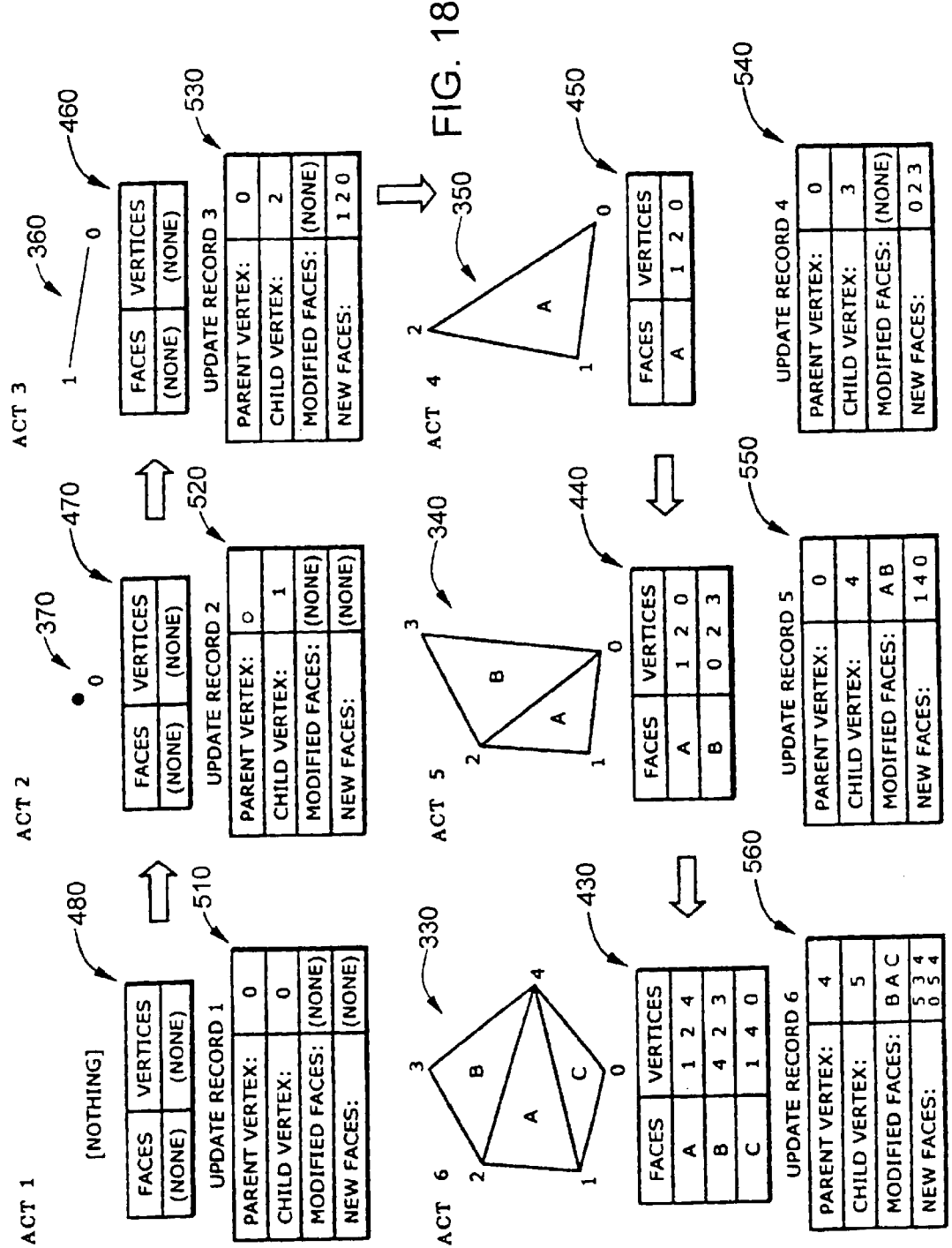
Figure 19:
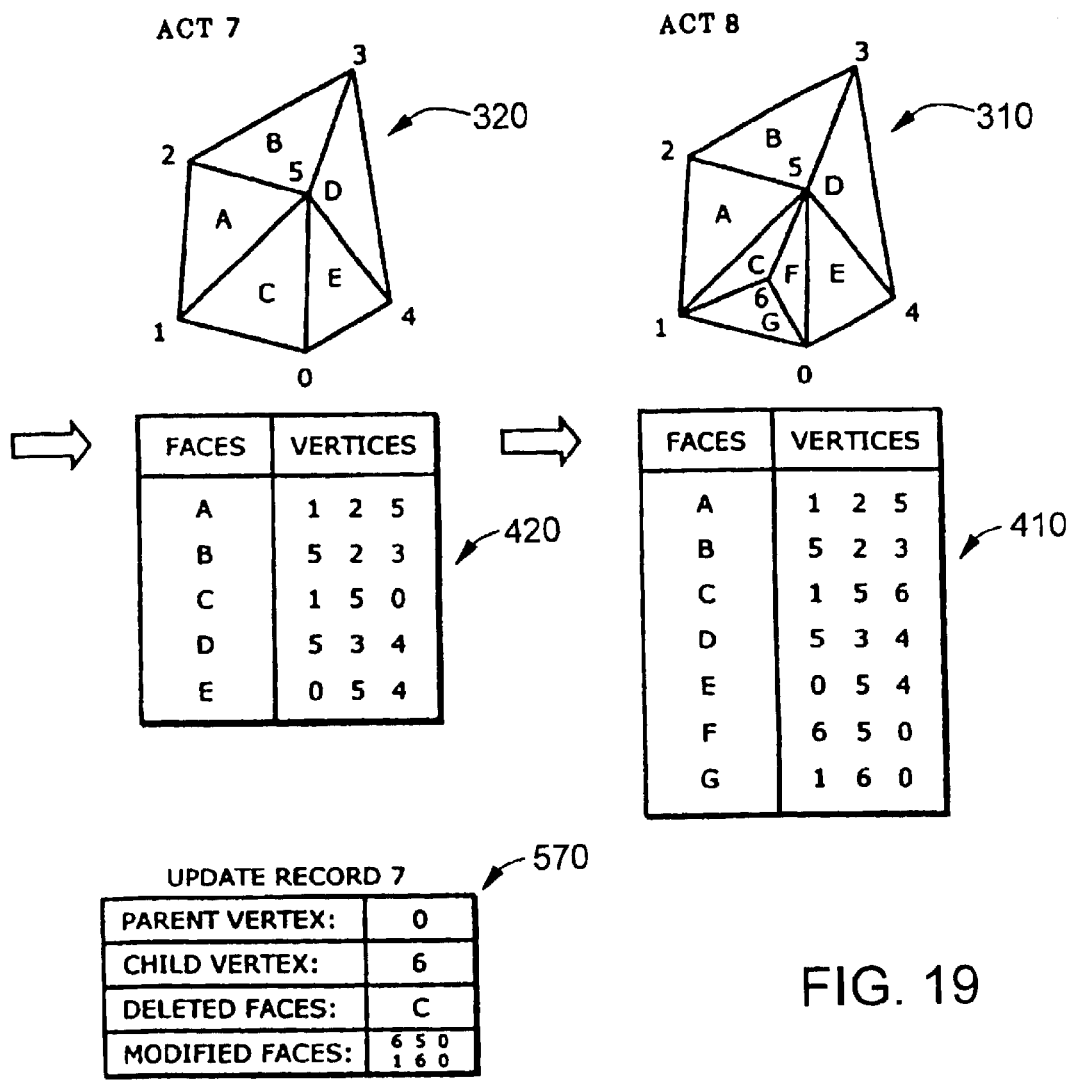
Figure 20:
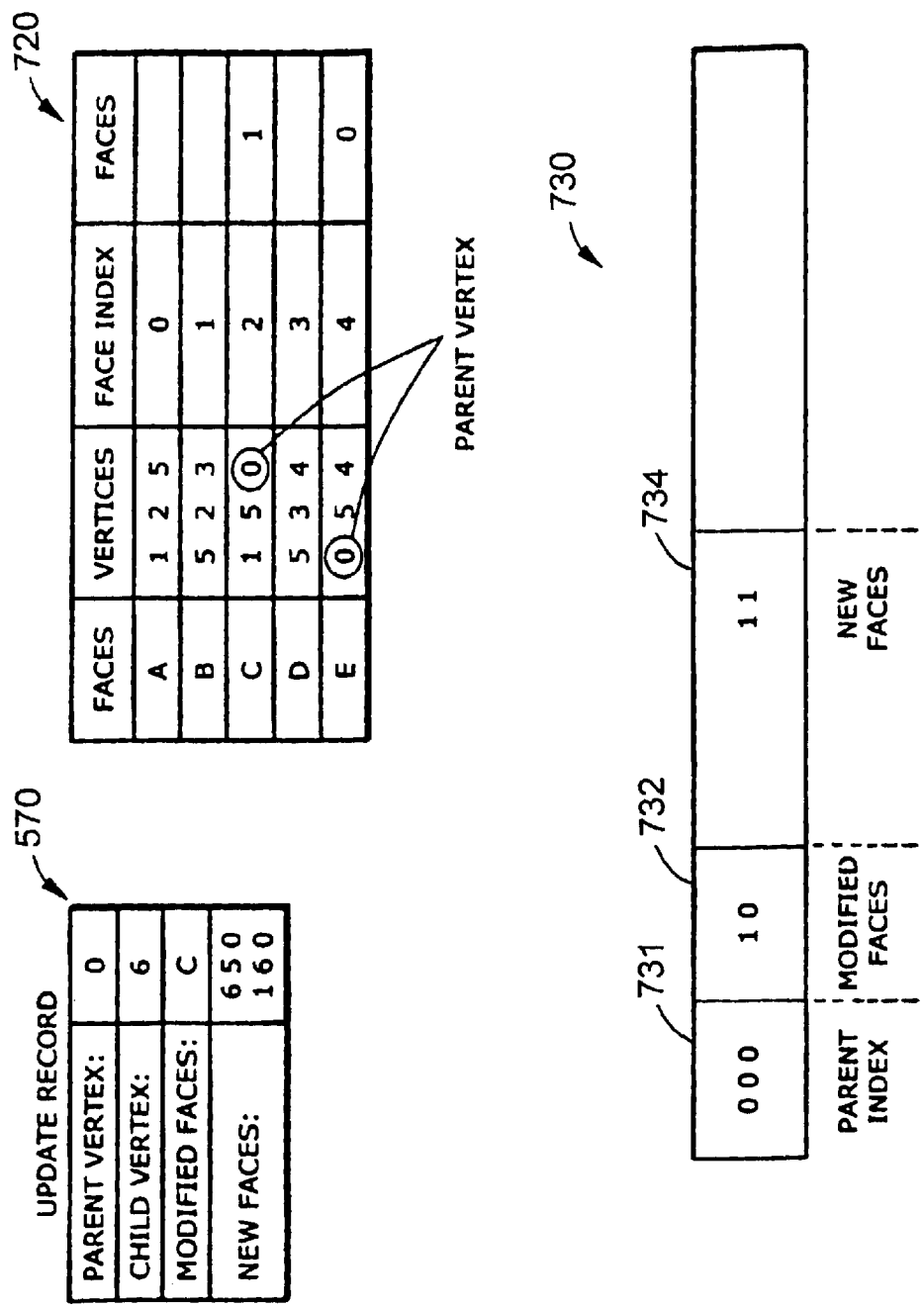

FIG. 16 is a diagram illustrating a series of edge-collapse operations 310–370 upon a mesh that continues until no mesh vertices remain. Each such operation may be described in an update record that can be used to reconstruct the mesh from scratch later. As shown, each operation is described as inheritance of a child vertex's connections by a parent vertex that may alter or delete existing mesh faces. FIG. 17 shows the effect of the operations on a table of faces 410–480. FIGS. 18 and 19 illustrate how the information in FIGS. 16 and 17 can be encoded in a series of update records 510–570 that describe how to reverse the operations and reconstruct the mesh. FIG. 20 shows an efficient scheme for encoding an update record. As shown, update record 570 can be compactly encoded in data structure 730. The data structure 730 codes a parent vertex as an index into a table of vertices that includes the vertex coordinates. The index is encoded using an unsigned binary number using ceiling ($\log_2 m$) bits, wherein ceiling (x) is an operation to round x up to the next whole number. The child vertex is not encoded because it is always the next vertex index. All the faces that contain the parent index in the order they are found in the face table 720 are enumerated. The enumeration is performed by a state machine. The structure 730 includes a single bit for each face 732 including the parent vertex. If this bit is at a first logical state (e.g., 0) then the face is not modified. If this bit is at a second logical state (e.g., 1) then the face is modified. Since all new faces contain a parent vertex, a child vertex, and one other vertex, it is necessary to enumerate all of the other vertices that are connected to the parent vertex. The enumeration is performed by a state machine. The order is determined by the order in which they are found in the face table 720.

Embodiments

Figure 21:
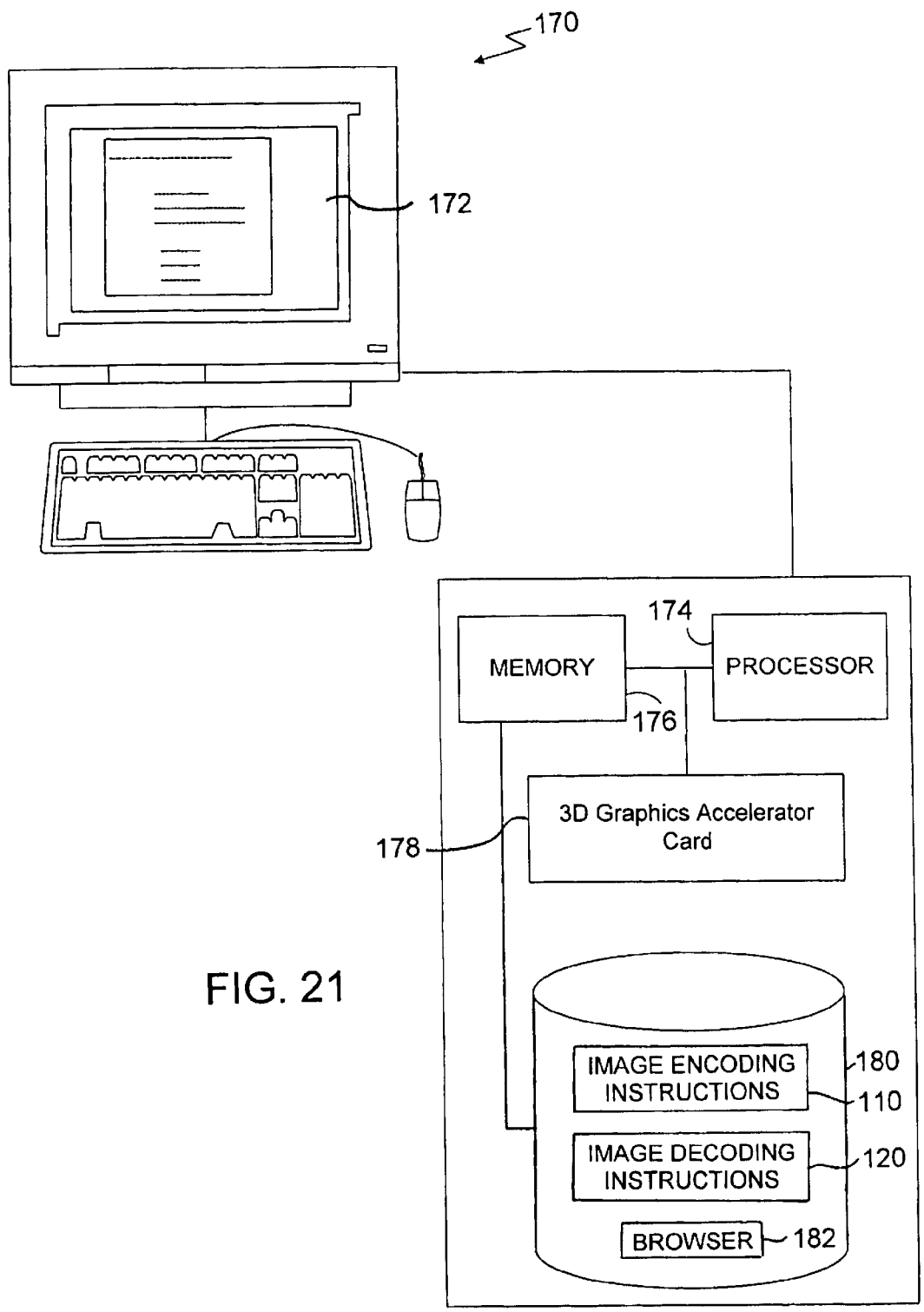
FIG. 21 is a diagram of a computer.

FIG. 21 shows a computer for processing images using the techniques described above. The computer includes a processor 174, memory 176, a storage medium 180 (e.g., hard disk), and preferably a 3D graphics card 178 that provides 3D shading routines. The storage medium 180 stores instructions for encoding 110 and decoding 120 images for display on a monitor 172. The instructions may be called from a variety of programs such as a browser 182.

The techniques described here, however, are not limited to any particular hardware or software configuration; they may find applicability in any computing or processing environment. The techniques may be implemented in hardware or software, or a combination of the two. Preferably, the techniques are implemented in computer programs executing on programmable computers that each include a processor, a storage medium readable by the processor (including volatile and non-volatile memory and/or storage elements), at least one input device, and one or more output devices. Program code is applied to data entered using the input device to perform the functions described and to generate output information. The output information is applied to one or more output devices.

Each program is preferably implemented in a high level procedural or object oriented programming language to communicate with a computer system. However, the programs can be implemented in assembly or machine language, if desired. In any case, the language may be a compiled or interpreted language.

Each such computer program is preferable stored on a storage medium or device (e.g., CD-ROM, hard disk or magnetic diskette) that is readable by a general or special purpose programmable computer for configuring and operating the computer when the storage medium or device is read by the computer to perform the procedures described in this document. The system may also be considered to be implemented as a computer-readable storage medium, configured with a computer program, where the storage medium so configured causes a computer to operate in a specific and predefined manner.

Other embodiments are within the scope of the following claims. For example, while described as operating on a two-dimensional image, the image may be a single frame in a series of video frames. In this case, the encoding of the image may be described as changes to the mesh instead of completely re-encoding the mesh for each frame.

What is claimed is:

1. A method of encoding a two-dimensional image, comprising:

receiving data describing pixels in a two-dimensional image that is not defined by a triangular mesh;

constructing a two-dimensional triangular mesh that defines the two-dimensional image using at least some of the pixels as mesh vertices, data for vertices of the two-dimensional triangular mesh including three vertex values, two of the vertex values defining a location of a vertex and a third one of the vertex values defining a display parameter for the vertex;

determining an error metric value by applying the three vertex values of each of the vertices of the two-dimensional triangular mesh to a three-dimensional mesh simplification technique;

reducing a number of edges in the two-dimensional triangular mesh in accordance with the error metric value; and encoding the two-dimensional triangular mesh.

2. The method of claim 1 wherein the data comprises at least one of the following: greyscale values or color values.

3. The method of claim 1 wherein reducing the triangular mesh comprises collapsing edges of the triangular mesh.

4. The method of claim 3 wherein collapsing comprises edge-collapsing until a predetermined total error-threshold has been exceeded.

5. The method of claim 3 wherein collapsing comprises selecting an edge for collapsing.

6. The method of claim 5 wherein selecting an edge is performed based on the error metric value.

7. The method of claim 1 wherein encoding the triangular mesh comprises constructing a dual graph from the mesh.

8. The method of claim 1 wherein encoding the triangular mesh comprises generating a series of records that describe how to construct the mesh.

9. The method of claim 1 wherein encoding the triangular mesh comprises constructing a tree from the mesh.

10. The method of claim 9 wherein the tree comprises a binary tree.

11. The method of claim 1 wherein encoding comprises encoding the mesh connectivity, vertex locations, and vertex display values.

12. The method of claim 1, wherein reducing the number of edges comprises:

collapsing edges until a total error threshold is exceeded, the total error threshold comprising a sum of squared differences between original image pixels and lower-resolution image pixels.

13. A method of encoding a two-dimensional image, comprising:

receiving data describing pixels in a two-dimensional image that is not defined by an N-gon mesh;

constructing a two-dimensional N-gon mesh that defines the two-dimensional image using at least some of the pixels as mesh vertices, data for vertices of the two-dimensional N-gon mesh including three vertex values, two of the vertex values defining a location of a vertex and a third one of the vertex values defining a display parameter for the vertex;

determining an error metric value by applying the three vertex values of each of the vertices of the two-dimensional N-gon mesh to a three-dimensional mesh simplification technique;

reducing a number of edges in the two-dimensional N-gon mesh in accordance with the error metric value; and encoding the two-dimensional N-gon mesh.

14. The method of claim 13 wherein the N-gon mesh comprises a triangular mesh.

15. The method of claim 13, wherein reducing the number of edges comprises:

collapsing edges until a total error threshold is exceeded, the total error threshold comprising a sum of squared differences between original image pixels and lower-resolution image pixels.

16. An article comprising a computer readable medium that stores executable instructions to encode a two-dimensional image, the instructions for causing a machine to:

receive data describing pixels in a two-dimensional image that is not defined by an N-gon mesh;

construct a two-dimensional N-gon mesh that defines the two-dimensional image using at least some of the pixels as mesh vertices, data for vertices of the two-dimensional N-gon mesh including three vertex values, two of the vertex values defining a location of a vertex and a third one of the vertex values defining a display parameter for the vertex;

determine an error metric value by applying the three vertex values of each of the vertices of the two-dimensional N-gon mesh to a three-dimensional mesh simplification technique;

reduce a number of edges in the two-dimensional N-gon mesh in accordance with the error metric value; and encode the two-dimensional N-gon mesh.

17. The article of claim 16 wherein the N-gon mesh comprises a triangular mesh.

18. The article of claim 16 wherein the instructions to reduce a number of edges in the mesh comprise edge-collapsing instructions.

19. The article of claim 16 wherein encoding comprises encoding mesh connectivity, vertex locations, and vertex display values.

20. The article of claim 16, wherein reducing the number of edges comprises:

collapsing edges until a total error threshold is exceeded, the total error threshold comprising a sum of squared differences between original image pixels and lower-resolution image pixels.

* * * * *